Sept. 4, 1934.    W. F. MacGREGOR    1,972,783
COMBINATION HARVESTER THRESHER
Filed Feb. 1, 1926    2 Sheets-Sheet 1
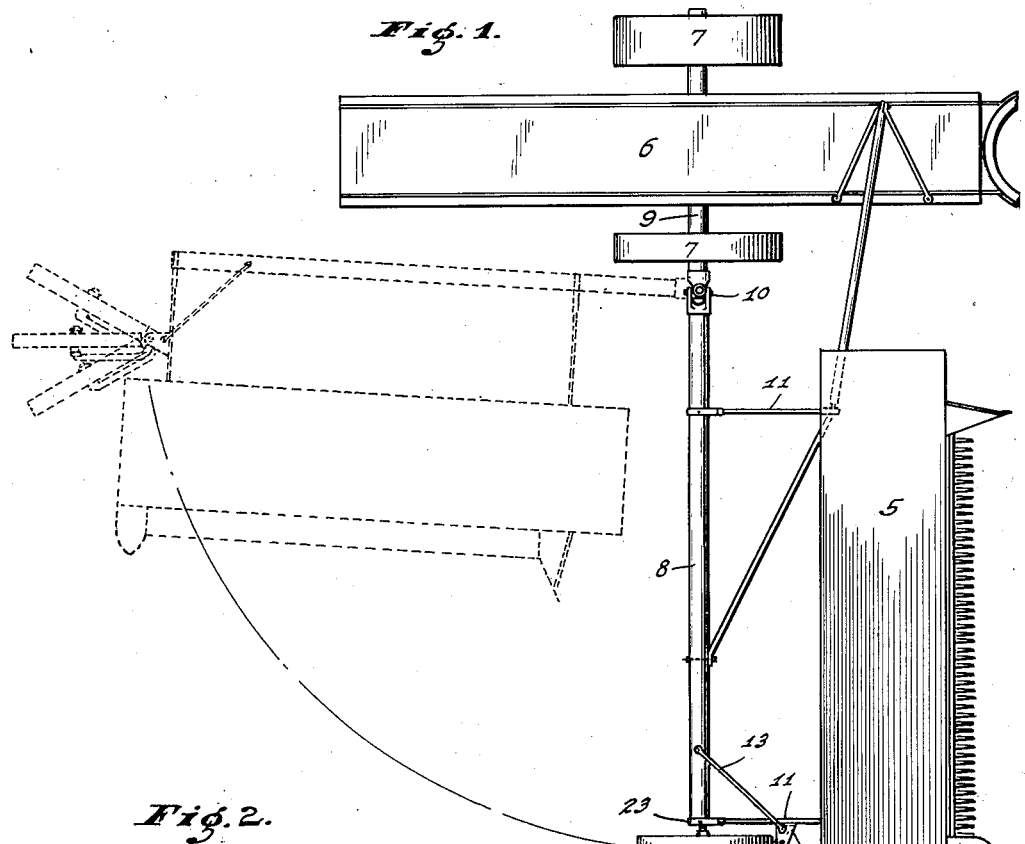
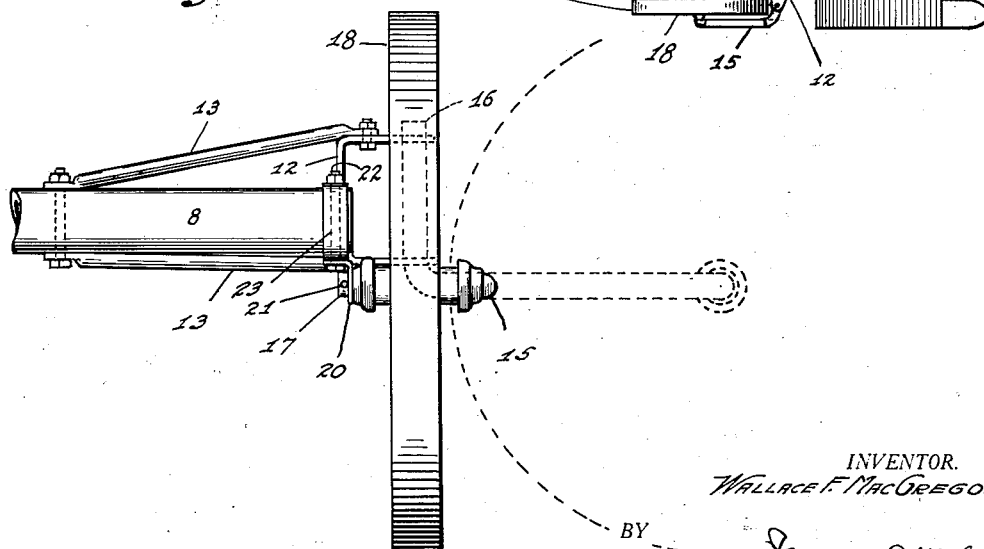
INVENTOR.
WALLACE F. MacGREGOR,
BY James Q. Walsh
ATTORNEY.

Sept. 4, 1934.   W. F. MacGREGOR   1,972,783
COMBINATION HARVESTER THRESHER
Filed Feb. 1, 1926   2 Sheets-Sheet 2
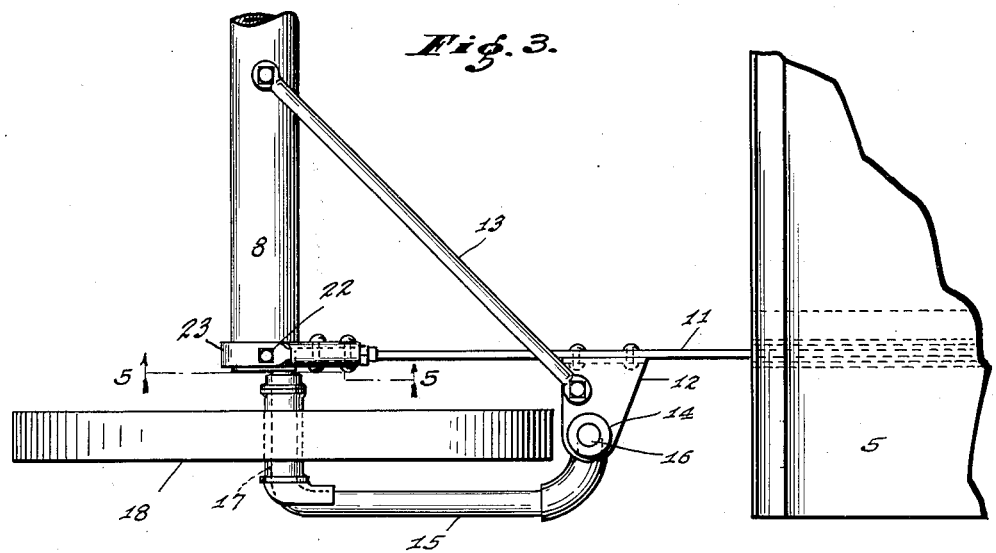
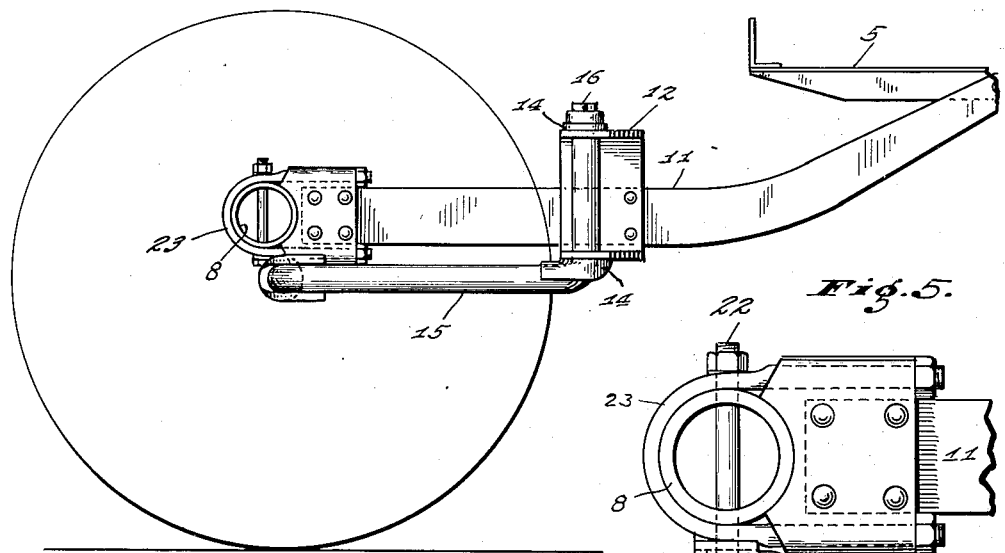
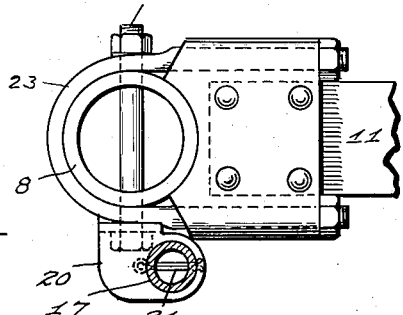
INVENTOR.
WALLACE F. MacGREGOR,
BY James A. Walsh,
ATTORNEY.

Patented Sept. 4, 1934

1,972,783

UNITED STATES PATENT OFFICE 1,972,783

COMBINATION HARVESTER-THRESHER

Wallace F. MacGregor, Racine, Wis., assignor to J. I. Case Company, Racine, Wis., a corporation Application February 1, 1926, Serial No. 85,197

12 Claims. (Cl. 56—122)

In the employment of a combination harvester-thresher of the character disclosed in Patent No. 16,378, reissued July 6, 1926, upon my application, wherein means are provided for folding the harvester element alongside the thresher so that the width of the entire machine may be materially lessened to permit its travel through gates, over bridges, and other comparatively narrow passageways, it has been found in practical use in the fields that it is of great importance and advantage to so equip the harvester that when in its normal cutting position it will approximately follow the line of travel of the thresher, that is to say, when it is disposed transversely in relation to such thresher and flexibly connected thereto as disclosed in said patent, it will respond to and harmonize with the vibrations of the thresher and readily traverse the ground irregularities encountered during movements of said thresher, and when it is necessary to fold said harvester alongside the thresher it is equally important that the same relation should exist and that said harvester should travel and absorb the effect of ground irregularities together with said thresher; and, therefore, it is my object to provide means for accomplishing such results, as will more fully appear by the following description and the drawings forming part hereof, in which latter Figure 1 is a plan indicating a combination harvester-thresher, the harvester (or header) being shown in full and dotted lines; Fig. 2 a fragmentary rear elevation showing the wheel (and associated parts in cutting position) which I employ for supporting said harvester; Fig. 3 a fragmentary plan thereof on an enlarged scale; Fig. 4 a side elevation indicating said wheel and other parts; and Fig. 5 is a detail as seen when looking in the direction indicated by the arrows 5—5 in Fig. 3.

In said drawings the portions marked 5 and 6 indicate the thresher and harvester elements, respectively, of a machine to which my improvement relates, said thresher having one or more carrying wheels, 7, the axle, 8, of the harvester being flexibly connected to the axle, 9, of the thresher or other part thereof by a universal or other coupling, as 10, for permitting the harvester to be folded alongside the thresher, as indicated by the dotted lines in Fig. 1, so that the width of the machine may be materially reduced for traveling over or through narrow passageways, said harvester being connected to axle 8 by arms, 11, or otherwise as may be desired.

Upon a suitable part of the harvester I secure a yoke, 12, which may be braced to the axle 8 by a rod, 13, or otherwise, and preferably embodies bearings, 14, to which I hingedly connect an arm, 15, by its pintle, 16, said arm terminating in a spindle, 17, for supporting a wheel, 18, said spindle 17 being secured in an eye-bracket or bearing, 20, by a cotter-pin, 21, or other suitable removable device. The eye-bracket 20 is fastened to the under side of axle 8 by a bolt, 22, preferably passing through a clip, 23, and said axle 8, said parts thus forming a support for an arm 11 of the harvester. As shown by the full lines in the drawings, said wheel 18 normally is in substantial alinement with a carrying wheel, as 7, of the thresher, so that as the machinery is traveling through the fields the harvester will be supported by said wheel in relation to the thresher in proper manner to facilitate its movement in the same direction with the thresher either in a straight or a turning course and either forward or backward. When it becomes necessary to fold the harvester 5 alongside the thresher axle brace 24 is detached, permitting said harvester to be pushed into substantially the position indicated by the dotted lines in Fig. 1, the wheel 18 following the circular path about the center 10. The spindle 17 is then detached from eye-bracket 20 by removing pin, 21, or otherwise, so that arm 15, with the wheel 18, may be swung in position to permit said wheel to rotate or travel in the direction of thresher wheel 7, as plainly shown by said dotted lines in said Fig. 1; in other words, said wheel 18 thus serves the purpose of a supporting wheel so flexibly mounted as to follow the line of travel of the longitudinally arranged harvester when occupying its folded or parallel relation to the thresher. The harvester 5 is thus supported by coupling 10 and wheel 18 in the working position shown by the full lines, and also in the folded position shown by the dotted lines, as well as all intermediate positions during the folding or unfolding operation. The coupling 10 allows the wheel 18 to follow up and down as unevenness of the ground surface may require, and said wheel 18, being castered about the pintle 16, is free to follow the course of the wheel or wheels 7 whether it be in a straight, curved or turning position. In the manner stated I provide a utility wheel which may be fixedly secured to the harvester in alinement with the thresher wheel or wheels so that it will support and be guided by said harvester when in transverse relation to the thresher during cutting and threshing operations, and which may also be adjusted in relation to said harvester, when the latter is folded alongside the thresher, to rotate in the direction of travel of the latter, and, with the axle 8, support said harvester in such relation to the thresher for travel over roadways or through narrow passageways and the like.

I claim as my invention:

1. In a machine of the class described, a thresher, a harvester, a support for the harvester, means connecting the support to the thresher for folding the harvester alongside the thresher, a caster-wheel supported by the harvester, and detachable means for locking the wheel to the support to position and maintain said wheel for rotation in the direction of travel of the harvester during cutting operations and for unlocking the wheel to swivel as the harvester is being folded and while traveling in folded position alongside the thresher.

2. In a machine of the class described, a thresher, a harvester, a yoke mounted on said harvester, an arm hingedly connected to the yoke, a spindle on said arm, a wheel mounted on the spindle, a support for the harvester, and detachable means for securing the spindle to the harvester support to position the wheel to travel in the direction of the harvester when the latter is arranged transversely of the thresher for cutting operations and to release the spindle from said support whereby said wheel may swivel when the harvester is being folded and when traveling in folded position alongside the thresher.

3. In a machine of the class described, a thresher, a harvester, an axle hingedly connected to the thresher and supporting the harvester, a bearing on said harvester, a wheel swivelingly mounted in the bearing, and means detachably securing the wheel to the axle to maintain the wheel in traveling relation to the harvester when in cutting operation and for releasing the wheel from the axle whereby the wheel may swivel as the harvester is being folded and positioned longitudinally alongside the thresher.

4. In a machine of the class described, a thresher, a harvester, a support for the harvester, flexible means connecting the support to the thresher, an arm comprising a pintle and a spindle mounted on the harvester, a wheel mounted on the spindle, and detachable means for securing the spindle to the harvester support for maintaining the wheel in traveling relation to the harvester when in cutting operation and for releasing the spindle from the support to swivel as the harvester is being folded and when traveling in longitudinal position alongside the thresher.

5. In a machine of the class described, a thresher, a harvester, a support for the harvester flexibly connected to the thresher, a grain wheel pivotally connected to the harvester, and means for securing the grain wheel to the harvester support for maintaining the wheel in traveling relation to the harvester when in cutting operation and for releasing said wheel from the support to swivel as the harvester is being folded and positioned alongside the thresher to travel therewith.

6. In a machine of the class described, a thresher, a harvester, a support for the harvester flexibly connected to the thresher, a bearing on the outer end of the support, a pivotally mounted spindle on the harvester, a wheel on the spindle, and means for securing the spindle to the bearing for maintaining the wheel in traveling relation to the harvester when in cutting operation and for releasing the spindle from the bearing whereby the spindle will swivel as the harvester is being folded and positioned alongside the thresher to travel therewith.

7. In a machine of the class described having a harvester part foldable rearwardly in a horizontal plane, a fixed grain wheel supporting the harvester in its normal cutting position, and means whereby the same wheel may support the harvester in its folded position and function as a trailing caster wheel.

8. In a machine of the class described, a main frame, an axle hingedly and foldingly connected to said frame normally extending laterally therefrom and foldable rearwardly in a horizontal plane, a harvester carried on said axle, a wheel supporting the outer end of the axle and normally fixed against castering, said wheel provided with means for causing it to be freed to function as a castering transport wheel when the axle is folded.

9. In a harvester thresher, a main frame, a harvester including an axle floatingly and also foldingly connected to said frame for folding movement rearwardly in a horizontal plane, a wheel supporting the outer end of the harvester, means fixedly connecting the wheel in place so that it may function as a grain wheel when the harvester is in cutting position, and means for causing a free castering action of said wheel when the harvester is folded.

10. In a harvester thresher, a main frame, a harvester including an axle floatingly and foldingly connected to said frame, said harvester normally extending laterally of the main frame, a wheel support pivotally connected to the outer end of the axle to support the harvester, means for preventing pivotal movement of said support when the harvester is in its normal lateral position, said means being removable when the harvester is in folded position to permit the support to function as a caster wheel.

11. In a harvester thresher, a main frame, a harvester part pivotally connected thereto for folding rearwardly in a horizontal plane, said harvester part extending normally laterally of the main frame, a wheel support for the outer end of the harvester part, a latch means for preventing castering of the wheel in said position, said latch being disconnectible for causing the wheel freely to caster when the harvester part is folded.

12. In a harvester thresher, a main frame, a harvester part normally laterally offset from and floatingly connected to the main frame, said harvester part also foldingly connected to the main frame to adapt the same for rearward folding in a horizontal plane, a single wheel support for the outer end of the harvester part, and means for locking said wheel support to function as a grain wheel when the harvester part is in its normal lateral position, said wheel when unlocked functioning as a trailing caster wheel support when the harvester part is folded.

WALLACE F. MacGREGOR.